Nov. 3, 1964  E. LASKOWSKI  3,155,136
APPARATUS FOR FABRICATING WIRE-CONNECTOR ASSEMBLIES
Filed Dec. 29, 1960  9 Sheets-Sheet 1

Inventor
Edward Laskowski
by Paul A. Frank
His Attorney

Inventor
Edward Laskowski
by Paul A. Frank
His Attorney

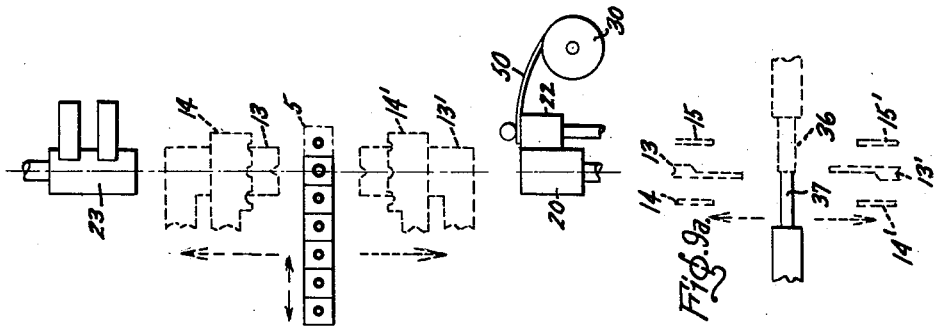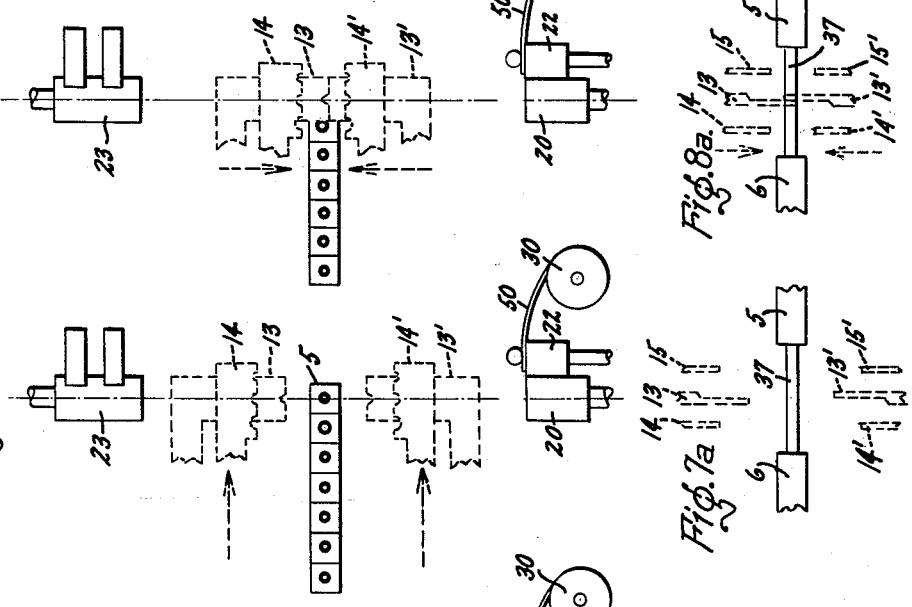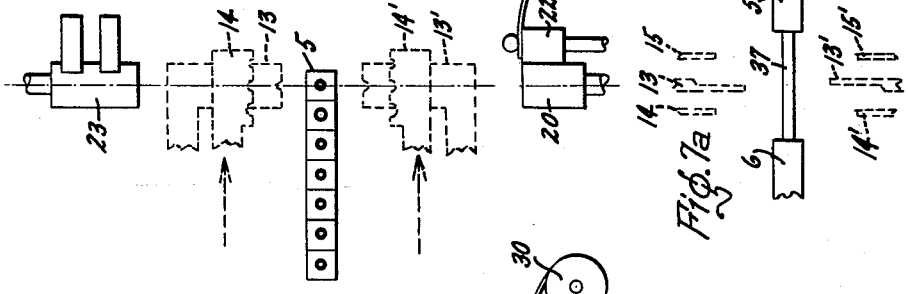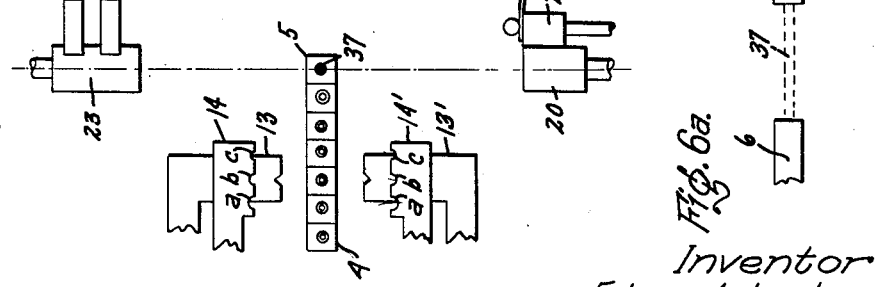

Nov. 3, 1964  E. LASKOWSKI  3,155,136
APPARATUS FOR FABRICATING WIRE-CONNECTOR ASSEMBLIES
Filed Dec. 29, 1960  9 Sheets-Sheet 4
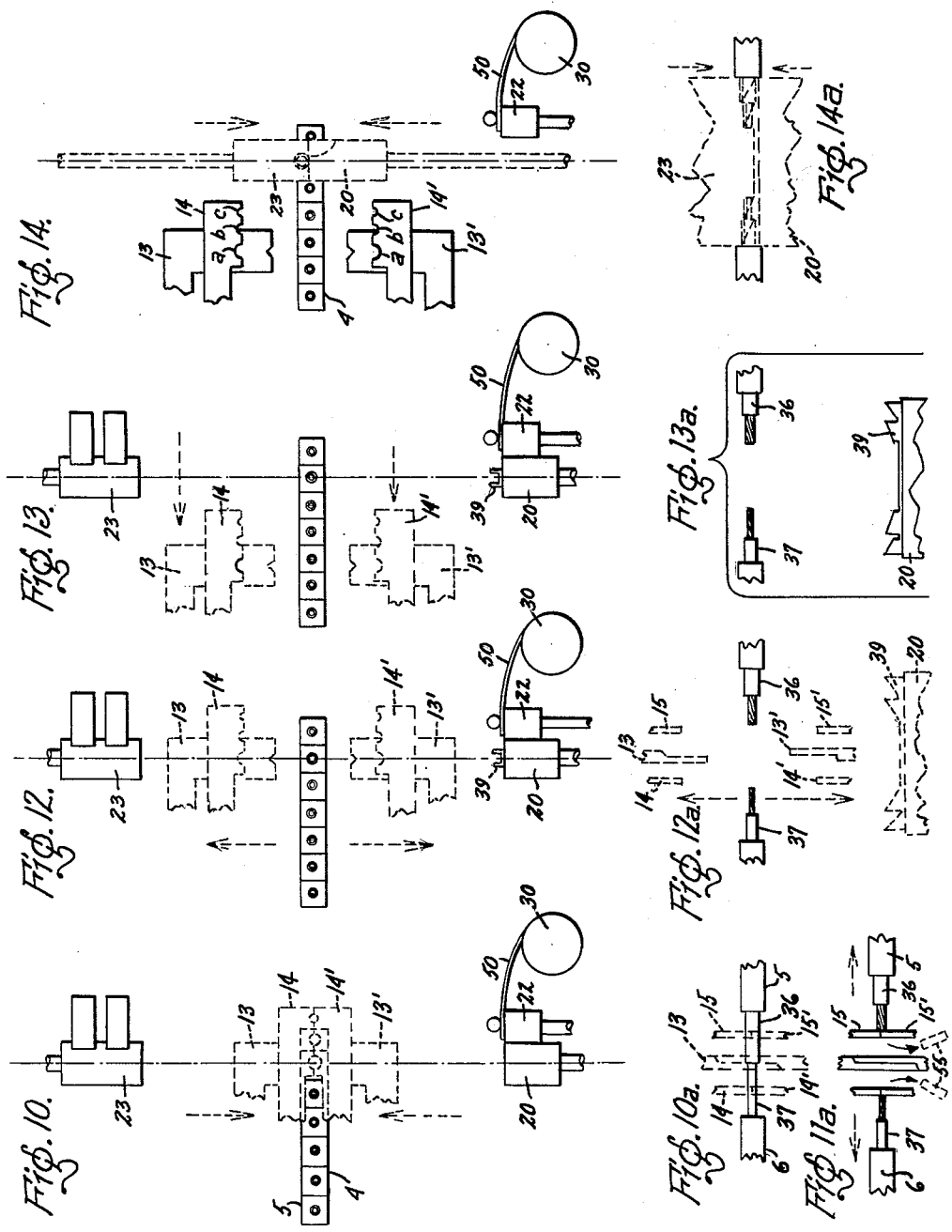
Inventor
Edward Laskowski
by Paul A. Frank
His Attorney

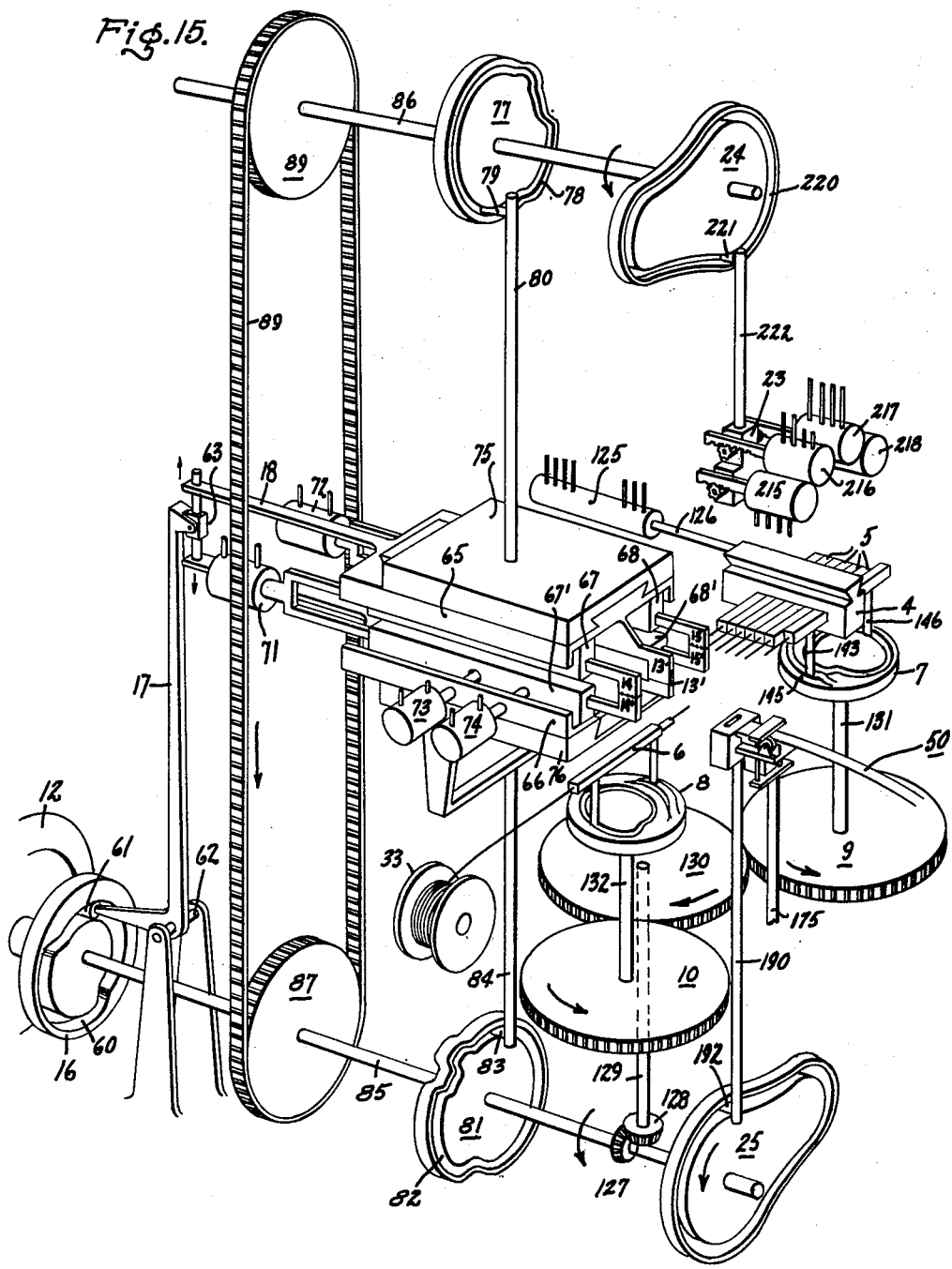

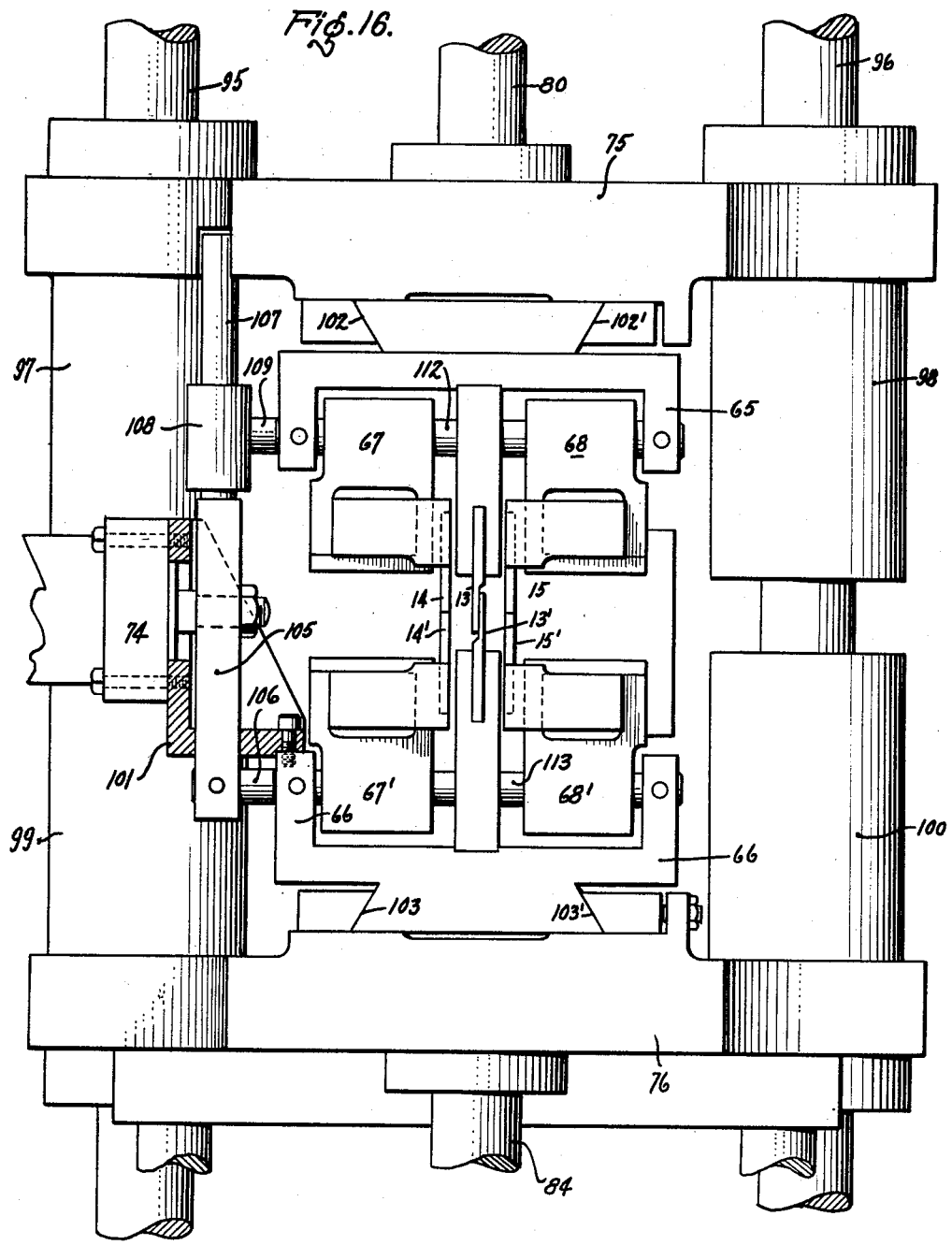

Nov. 3, 1964 E. LASKOWSKI 3,155,136
APPARATUS FOR FABRICATING WIRE-CONNECTOR ASSEMBLIES
Filed Dec. 29, 1960 9 Sheets-Sheet 7

Inventor
Edward Laskowski
by Paul A. Frank
His Attorney

Nov. 3, 1964  E. LASKOWSKI  3,155,136
APPARATUS FOR FABRICATING WIRE-CONNECTOR ASSEMBLIES
Filed Dec. 29, 1960  9 Sheets-Sheet 8
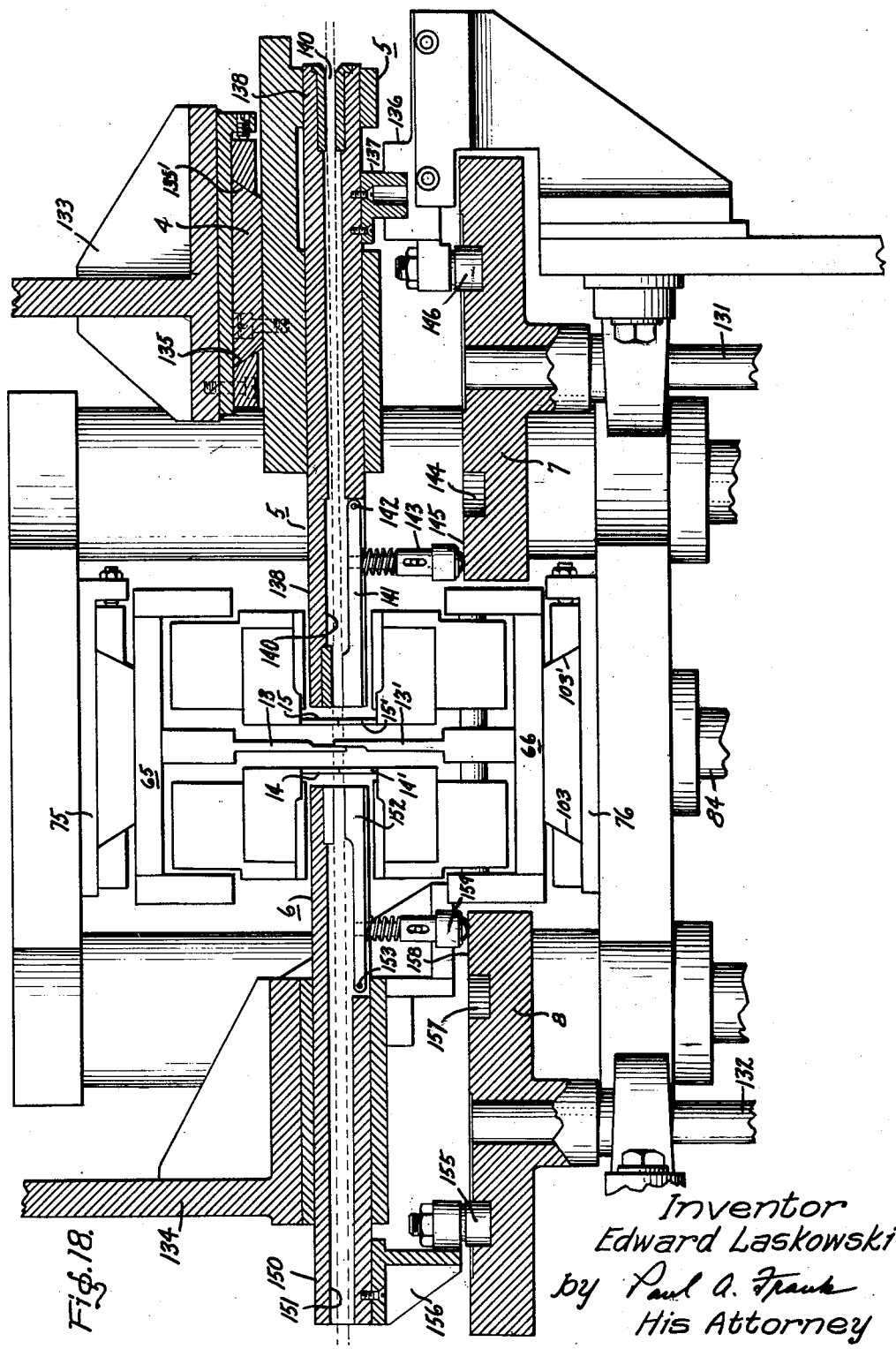
Inventor
Edward Laskowski
by Paul A. Frank
His Attorney

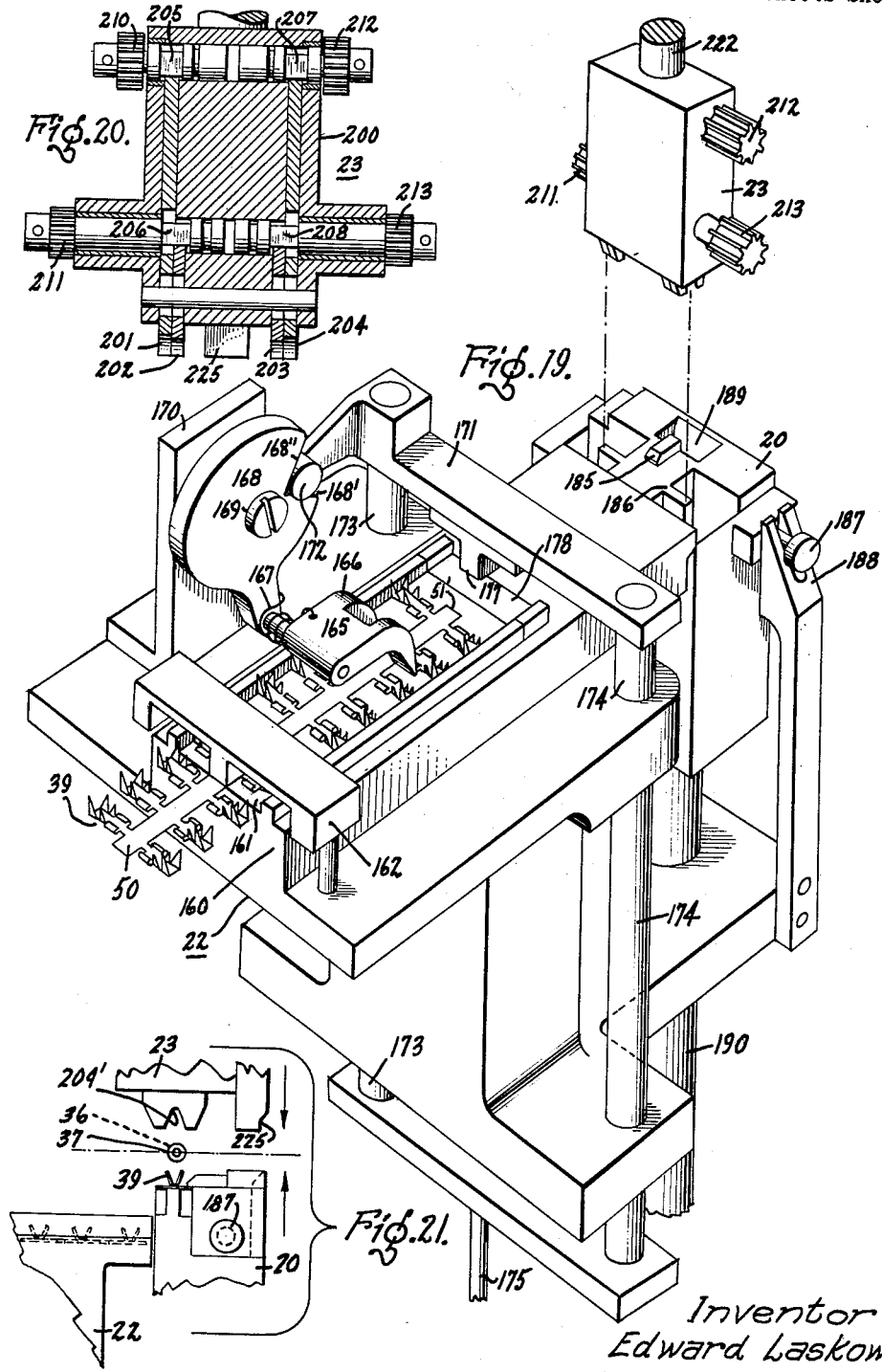

United States Patent Office 3,155,136
Patented Nov. 3, 1964

3,155,136
APPARATUS FOR FABRICATING WIRE-CONNECTOR ASSEMBLIES
Edward Laskowski, Amsterdam, N.Y., assignor to General Electric Company, a corporation of New York
Filed Dec. 29, 1960, Ser. No. 79,449
5 Claims. (Cl. 153—1)

The present invention relates to a method and apparatus for fabricating wire leads, and more particularly, to a method and apparatus for fabricating wire lead-connector assemblies.

The electrical connection of a plurality of points in an apparatus has heretofore required the services of a technician to select the proper gage of wire, cut the wire to length, strip the insulation from the ends of the insulated wire and secure appropriate terminals thereto. In fabricating a small number of apparatus, the preparation of the wire leads with attached terminals and the connection of the leads to the apparatus are normally conjunct operations. However, in the wiring of a large number of apparatus, it is normal to prefabricate the wire leads having terminals mounted thereon and store the prefabricated wire leads until use. At the time of use, the wiring technician selects the proper wire lead and by following a wiring chart makes the electrical connections in the apparatus.

In my copending application filed December 29, 1960, Serial No. 79,369, now Patent No. 3,115,244, entitled "Wire-Connector Assembly," there is disclosed a wire-connector assembly including a plurality of wire leads of desired lengths and wire gages connected in a continuous length by connector assemblies, each connector assembly including two terminals in alignment having connecting portions located between the terminals. By fabricating and storing wire-connector assemblies in accordance with the teaching of my previous identified patent application, the cumbrous task of preparing individual wire leads prior to use is ameliorated and further, wire leads in desired lengths and gages with terminals attached thereto are supplied in a desired sequence for making the connections in a particular apparatus.

The chief object of the present invention is to provide a method and apparatus for fabricating a continuous supply of wire leads having terminals attached thereto.

Another object of the invention is to provide a method and apparatus for supplying a plurality of wire leads having novel terminals attached thereto to form a continuous length of wire leads connected by said terminals.

A further object of the invention is to provide a method and apparatus for fabricating an improved wire-connector assembly.

A still further object of the invention is to provide a method and apparatus for fabricating a continuous length of wire leads in desired lengths and gages.

These and other objects of my invention may be more readily perceived from the following description.

Briefly stated, the present invention is directed to a method and apparatus for forming wire-connector assemblies in which the ends of desired lengths of wire are oriented adjacent the ends of other wires and connectors are applied to the wire ends to form a continuous length of wires attached by the connectors. While the present invention is described with reference to insulated wire leads, it will be appreciated that it is also pertinent to the use of bare conductors.

The attached drawings illustrate a preferred embodiment of the invention, in which.

Figure 17:
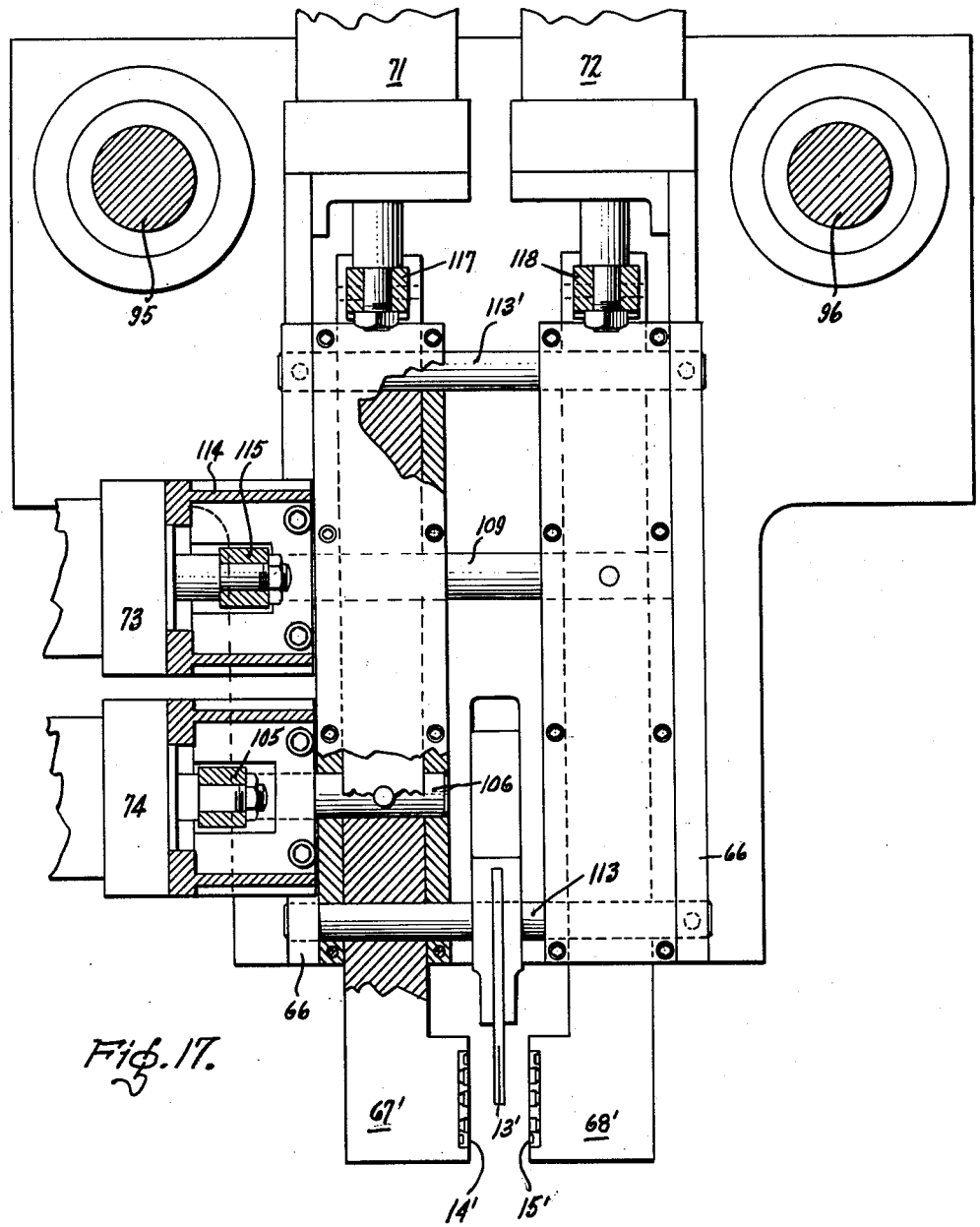

FIGURES 6, 6a 7, 7a, 8, 8a, 9, 9a, 10, 10a, 11a, 12, 12a, 13, 13a, 14, 14a are fregmentary views of operating portions of the apparatus illustrating the sequence of operations for selecting the wires, severing the wires, stripping the insulation from the wires, supplying and mounting the connector assemblies onto the wires;

FIGURE 15 is a fragmentary, partially diagrammatic, exploded perspective view of the operating components of the apparatus to energize the elements utilized in the sequence of operations illustrated in FIGURES 6–14a;

FIGURE 16 is a fragmentary front elevation view of the apparatus illustrating the severing means and wire insulation stripping means with associated adjusting means;

FIGURE 17 is a sectional view of the apparatus taken through a horizontal plane illustrating the wire severing and insulation stripping means with the adjusting means associated therewith;

FIGURE 18 is a view similar to FIGURE 16 partially in section to illustrate the wire-gripping means and the cam means utilized for actuating the wire-gripping means;

FIGURE 19 is a fragmentary perspective view illustrating the connector assembly supply means with associated severing means and also the anvil adapted to receive and retain a severed connector assembly;

FIGURE 20 is a sectional view of the crimping means utilized to engage the anvil shown in FIGURE 19; and FIGURE 21 is a fragmentary side elevation view showing the connector assembly supply means, crimping means, and the anvil.

Figure 1:
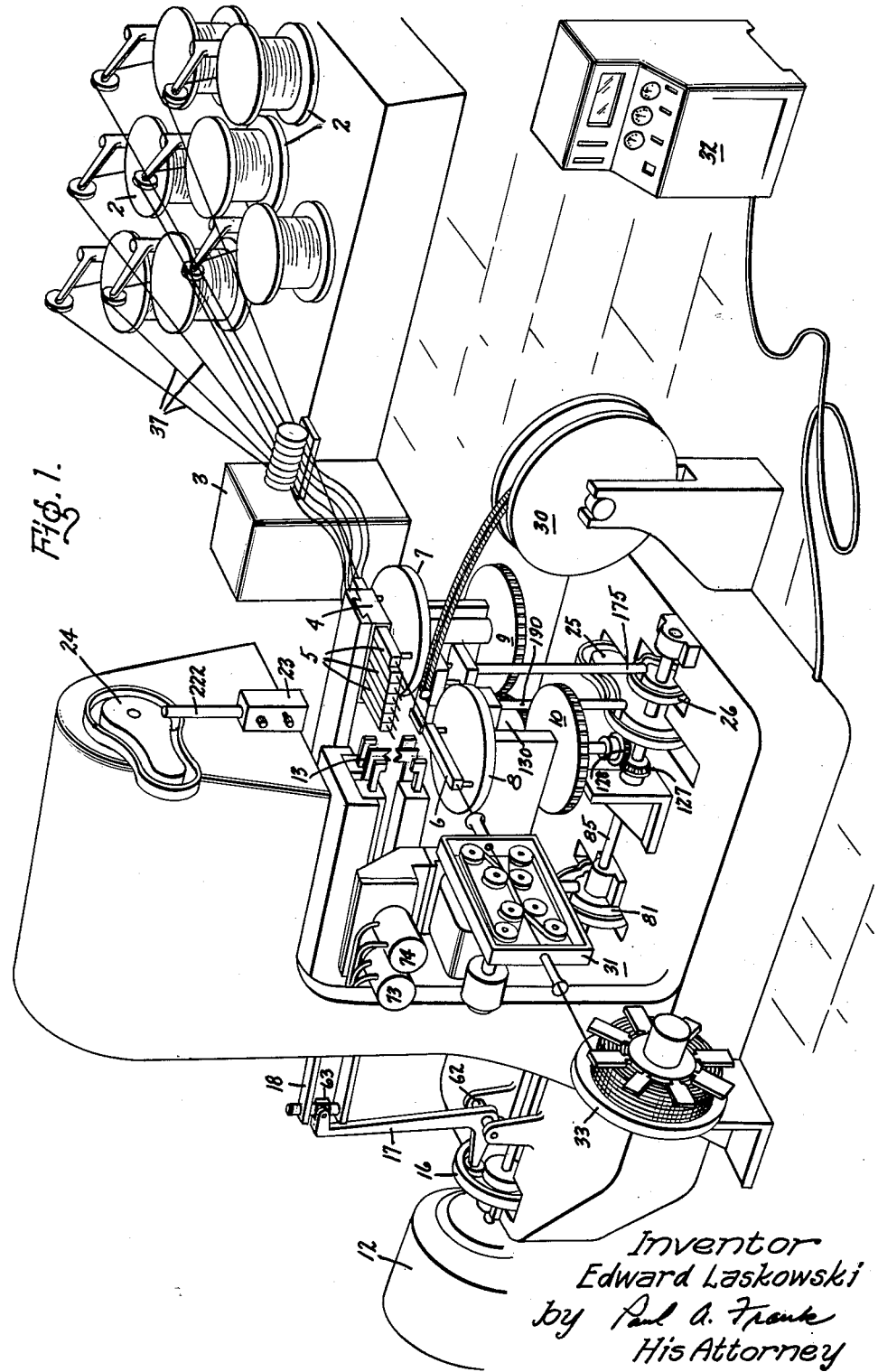
FIGURE 1 is a perspective view of an apparatus for practicing the present invention.

In FIGURE 1 there is shown a perspective view for an apparatus for forming wire-connector assemblies as described in my previously identified patent application in which the product consists of a plurality of wire leads of desired lengths and wire gages attached in a continuous length by means of connector assemblies, the connector assemblies each including a pair of connected terminals, the terminals having mounting means and wire connecting means. The wires are initially supplied from a plurality of reels to a selector bar adapted to supply a desired sequence of wires. After the wires are supplied, the ends are stripped of their insulation, and the previously described connector assemblies are applied to the ends of the stripped wires to form a continuous length of wire-connector assemblies mounted on a suitable spool for use.

In FIGURE 1 wires of different gages are supplied from a plurality of spools 2 through a prefeed mechanism 3 which applies sufficient force to draw the wire from the spools to the apparatus which performs the severing, insulation stripping, and terminal mounting operations. The individual wires from spools 2 are supplied to a reciprocal selector bar 4 which includes a plurality of first wire-gripping means 5 adapted to be individually in alignment with a single second wire-gripping means 6. Wire-gripping means 5 and 6 are adapted to be moved in opposite directions and to selectively grip wires passing therethrough, these actions being imparted by cams 7 and 8 which are associated with drive motor 12.

Initially, the wire is severed by cutter blades 13 and 13' and the insulation is removed at the ends of the wires by insulation strippers 14, 14', 15 and 15'. Cutters 13 and 13' and strippers 14, 14', 15, and 15' are associated with ram 18 which is moved horizontally adjacent the wires to be severed and stripped by means of cam 16 associated with motor 12, cam 16 being connected to ram 8 by means of bell crank 17.

After the wire has been cut and stripped of its insulation, a connector assembly is presented from spool 30 by supply means 22 to anvil 20 which is associated with crimping means 23 adapted to mount the connector assembly to the wire ends which have been stripped of their insulation. Cams 24 and 25 actuate anvil 20 and crimping means 23 and supply means 22 is actuated by cam 26. The selection of the particular wires to be cut and stripped of insulation is determined by suitable tape control 32 or other conventional control which also determines the amount of wire urged by drive means 31 onto supply reel 33. The tape control may be associated with pneumatic or electrical systems to actuate desired portions of the apparatus. Drive means 31 is illustrated as a pair of endless belts adapted to engage the wire-connector assembly. The amount of the product supplied is determined by tape control 32 which is associated with a suitable counter.

Figure 2:
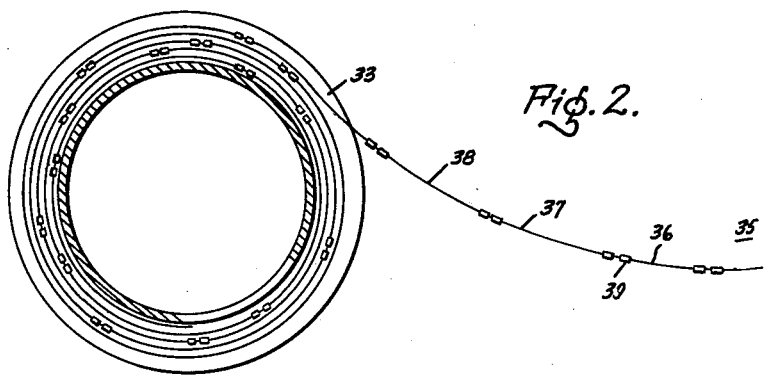
FIGURE 2 is a sectional view of a spool having the product wire-connector assemblies mounted thereon.
Figure 3:
FIGURE 3 is an enlarged view of the wire-connector assembly fabricated by the present invention.

In FIGURE 2 there is shown an enlarged view of supply reel 33 illustrating the product, namely, wire-connector assembly 35 being supplied to the reel and indicating that the wire-connector assembly comprises a plurality of wires 36, 37, and 38 having desired lengths and desired wire gages, connected by connector assemblies 39. FIGURE 3 is an enlarged view of a portion of the wire-connector assembly 35 shown in FIGURE 2 wherein a wire lead 36 has attached thereto connector assemblies 39, each of which comprise a pair of terminals 40 connected by connecting portions 52 and 53 and strip portion 51'. The connecting portions engage the terminals and attach them to the strip portion whose width is greater than the terminals for a purpose more fully described hereinafter.

Figure 4:
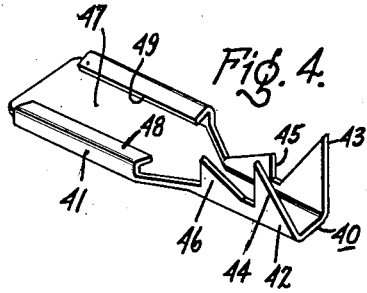
FIGURE 4 is an enlarged perspective view of a terminal which comprises a portion of the connector assembly utilized in FIGURES 2 and 3.

FIGURE 4 is an enlarged perspective view of an individual terminal 40 which comprises a mounting portion 41 and a wire-connecting portion 42. Wire-connecting portion 42 has a general ferrule shape with a first pair of tapered ears 43 and 44 which are adapted to be wrapped around the insulation portion of wire 36 shown in FIGURE 3. A second set of tapered ears 45 and 46 are located adjacent the mounting portions 41 and these tapered ears are adapted to engage the bare conductor portion of wire 36. Mounting portion 41 comprises a planar portion 47 having extending therefrom flanges 48 and 49 which are bent in a fashion whereby the mounting portion may engage suitable protuberances in an apparatus and grasp said protuberances between planar portion 47 and flange portions 48 and 49 to make an electrical connection.

Figure 5:
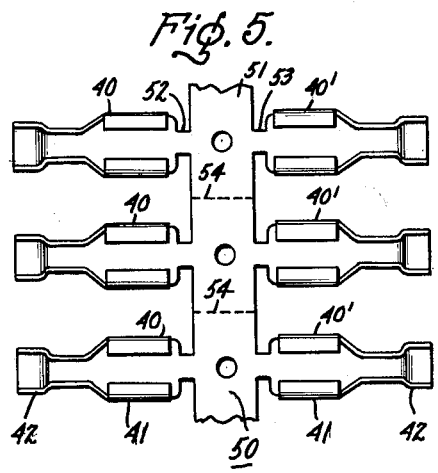
FIGURE 5 is an enlarged view of the terminal assembly supplied to the apparatus in FIGURE 1 to provide the connector assemblies for connecting the wires.

As previously mentioned, the connector assemblies are supplied to the apparatus in FIGURE 1 from a terminal assembly mounted on spool 30. FIGURE 5 illustrates a portion of terminal assembly 50 which comprises a first group of parallel terminals 40 and a second group of parallel terminals 40'. Individual terminals 40 and 40' in the first and second groups are located in alignment and are attached by means of connecting portions 52 and 53 to a strip 51 which connects the first and second groups of terminals into unitary connector assemblies. The terminal assembly 50 is supplied from spool 30 in the form shown in FIGURE 5 in such a manner that individual pairs of terminals 40 and 40' which comprise the connector assembly are severed at lines 54 during the fabrication of the wire-connector assembly. It will be appreciated that other forms of connector assemblies and terminals may be utilized to practice the present invention.

From the above description, there has been indicated the general nature and purpose of the apparatus illustrated in FIGURE 1 and also the type of materials supplied to the apparatus for forming the product which is a continuous length of wires of desired sizes and gages connected by connector assemblies. FIGURES 6–14a generally disclose the means, direction of movement, and the sequence for supplying the wires, severing the wires, stripping insulation from the wires, applying connector assemblies to the wires to fabricate the wire-connector assemblies. In FIGURES 6 and 6a there is shown a pair of co-acting wire cutters 13 and 13' and two pairs of insulation strippers 14, 14', 15 and 15' adapted to sever wires and also to strip the insulation from the ends of the wires. The insulation strippers include two pairs of cutters, each set of cutters is adapted to cut the insulation from one of the wires which is to be connected to the adjacent wire and each cutter includes three cutting blades, a, b, c, each adapted to be utilized with different wire sizes. The wire is supplied through the selector bar 4 which includes seven wire-gripping means 5. Each gripping means may contain a different gage of wire. As previously mentioned, the connector assemblies are supplied in the form of terminal assembly 50 from spool 30 and these are supplied to the supply means 22 which leads single connector assemblies 39 to anvil 20 which is reciprocally mounted and adapted to engage crimping means 23 which is also reciprocally mounted. The nature of the actuating means for the wire cutters and the wire insulation strippers are more fully described in the consideration of FIGURES 15, 16, and 17. The connector assembly feed means is more fully described in the consideration of FIGURE 19. FIGURES 19 and 21 disclose the nature of anvil 20 and FIGURES 19, 20, and 21 illustrate more fully the nature of crimping means 23.

In the consideration of FIGURES 6–14a, portions of the apparatus which are moving, about to move, or have momentarily completed a movement are shown in dotted lines and substantially stationary members are shown in solid lines. The prime numbered figures are side elevation views and "a" figures are front elevation views of the associated prime numbered figures. In FIGURES 6 and 6a, wire 37 is being supplied through one of the wire-gripping means 5. In FIGURE 6a, wire 37 is shown passing from wire-gripping means 5 to wire-gripping means 6. After a predetermined length of wire has been supplied as determined by tape control 32 shown in FIGURE 1, wire cutters 13 and 13' and wire installation strippers 14, 14', 15 and 15' are passed into position (FIGURES 7 and 7a) whereby wire 37 lies between the pairs of cutters. Wire cutters 13 and 13' come together to sever wire 37 as shown in FIGURES 8 and 8a. This motion is accompanied by a slight approaching of the opposite blades of the wire insulation strippers.

FIGURE 9 shows the wire cutters and wire insulation strippers being retracted from the area of the wire and also shows the selector bar having a plurality of wire gripping means 5 being moved to place another wire into alignment with wire gripping means 6. FIGURE 9a shows new wire 36 being placed in alignment with wire 37 which has been severed in FIGURES 8 and 8a.

In FIGURE 10 the wire strippers are brought together to suitably cut the insulation on wires 37 and 36. The position of blades 14 and 14' shown in FIGURES 6a, 7a, 8a, 9a, and 10a with respect to cutters 13 and 13' is determined by a control means comprised by a tape control 32 which determines the length of insulation to be stripped from the end of the wire. Tape control 32 also determines the particular cutting blades, a, b, or c, of wire insulation strippers to be utilized. It will be appreciated that in the case illustrated in FIGURE 10a a different pair of stripper blades may be utilized for the larger wire 36 than for the wire 37 and also the distance of strippers 15 and 15' from cutters 13 and 13' may differ. In FIGURE 10a, it can be seen that when the blades 14, 14', 15, and 15', which cut the insulation, come together, this action is accompanied by substantial overlapping of the cutter blades 13 and 13'. After the insulation has been severed, while the blades 14, 14', 15, and 15' are maintained in position, the wire gripping means as shown in FIGURE 11a are moved in opposite directions by means more fully described hereinafter thereby causing the severed insulation at the ends of the wires to be removed therefrom.

FIGURES 12 and 12a illustrate the next operation of the apparatus in FIGURE 1 wherein the cutter blades and the wire insulation strippers are removed from the area of wire severing and insulation stripping. This action is accompanied by the supplying of terminal assembly 39 on anvil 20, the connector assembly supply means being actuated to sever a connector assembly across line 54 in FIGURE 5 while simultaneously advancing severed connection assemblies toward anvil 20. A front view of this action is shown in FIGURE 12a wherein the wire cutter and the insulation strippers are being removed from the area of the wires 36 and 37. There is also shown the movement of the particular connector assembly into position prior to being mounted on the ends of wire 36 and 37.

In FIGURE 13 there is shown the retraction of cutters 13 and 13' and wire insulation strippers 14, 14', 15, and 15' from the area adjacent wires 36 and 37. FIGURE 13a is a front view showing wires 36 and 37.

This retraction of the wire cutters and the wire insulation strippers permits the crimping means 23 to approach the wires 36 and 37 and also permits the anvil 20 to supply the connector assembly adjacent the ends of wires 36 and 37. As crimping means 23 and the anvil 20 meet, the ears of each terminal are wrapped around a wire lead. Specifically, ears 43 and 44 engage the insulation of a wire lead and ears 45 and 46 engage the conductor portion of the wire lead. Wires 36 and 37 are thereby connected by a connector assembly which provides a pair of terminals for use in wiring a particular apparatus. After a connector assembly has been attached to the wires, the wire gripping means are advanced toward one another and to the position in FIGURE 6a. The sequence starting from FIGURE 6 is repeated.

From the description of the operation of the apparatus in FIGURE 1, with special reference to FIGURES 6 through 14a, it is noted that the wire cutters and the wire insulation strippers individually have a number of selective movements. The wire cutters and the wire insulation strippers are placed in vertical alignment with the wires to be cut and stripped. Initially, the movement of the cutters and strippers being such that the cutters only come together and this is followed by an operation in which both the cutters and the strippers meet. Furthermore, there is a selection of a particular set of blades a, b, or c for stripping the insulation and a determination of the blade disposition to regulate the length of insulation to be stripped.

FIGURE 15 is a fragmentary, partially diagrammatic, exploded perspective view of a portion of the apparatus illustrated in FIGURE 1 indicating the means which may be provided to supply these desired movements to the cutters and strippers. As previously noted, power is received from a suitable motor 12 which drives cam 16 a single revolution, this cam 16 having cam surface 60 adapted to engage cam follower 61 mounted on one end of bell crank 17 which is pivoted about shaft 62. The other end of bell crank 17 is provided with a slider 63 adapted to engage the end of ram 18 which moves the wire cutters 13 and 13' and wire insulation strippers 14, 14', 15, and 15' into vertical alignment with the wire to be severed and stripped. Motor 12 in rotating cam 16 a single revolution selectively moves ram 18 into the operative position shown in FIGURE 7 and out of operative position as shown in FIGURE 13 to permit access of the anvil and crimping means to the work area or operative position. To permit reciprocating motion of ram 18 relative to the operative position, the ram is movably mounted on suitable tracks in platen members 75 and 76.

Ram 18 comprises an upper carriage member 65 and a lower carriage member 66. Wire cutters 13 and 13' may be attached to carriage members 65 and 66 respectively. However, the wire insulation stripper cutters 14, 14', 15, and 15' are not attached to the carriage members directly but rather are mounted in slide members 67, 67', 68 and 68', respectively. Slide members 67 and 67' are selectively motivated by pneumatic cylinder 71 and slide members 68 and 68' are selectively moved by cylinder 72. Since the insulation strippers are provided with three sets of stripper blades a, b, c, pneumatic cylinders 71 and 72 each have three independent operating positions determined by tape control 32 in FIGURE 1. For example, in FIGURE 9a, cylinder 71 may select a different set of strippers than cylinder 72 since wire 37 is of a smaller size than wire 36.

In certain situations, the amount of insulation removed from each wire end may also vary and to perform this function pneumatic cylinder 74 may suitably position strippers 14 and 14' to determine the amount of insulation removed from wire 37 as shown in FIGURE 11 and pneumatic cylinder 73 may position strippers 15 and 15' in such a manner to remove a desired amount of insulation from wire 36.

Reviewing the operation of the wire cutters and insulation stripper cutters in FIGURES 6–14a, in FIGURE 8a the cutters 13 and 13' come into contact without any engagement between the pairs of wire insulation strippers. However, in FIGURE 10, it can be seen that both the wire insulation strippers and the cutters do come into contact. Cams 77 and 81 supply the desired vertical motions to the cutters and strippers. Cam 77 is provided with a cam surface 78 which determines the motion sequence and the extent of the reciprocation of platen 75 by urging cam follower 79 attached to rod 80 to move platen 75 in the desired manner. Cam 81 with cam surface 82 supplies a similar motion to cam follower 83 which is attached to platen 76 by means of rod 84. Motion is supplied to the respective cams 77 and 81 by shaft 85 attached to motor 12. Cam 77 on shaft 86 is operatively connected to shaft 85 through sprocket 88, chain 89 and sprocket 87.

FIGURE 16 shows a partial front elevation view of a portion of the apparatus in FIGURE 1 illustrating the mounting details of the wire cutters and the wire insulation strippers. In FIGURE 16, it is noted that rod 80 actuates upper platen 75 which is reciprocally mounted on vertical columns 95 and 96 by means of sleeve connections 97 and 98. Similarly, the lower platen 76 is actuated by rod 84, platen 76 being reciprocally mounted by means of sleeves 99 and 100 on columns 95 and 96.

Carriage member 65 may be moved in a horizontal direction with respect to platen 75 on tracks 102 and 102' and similarly, carriage member 66 may be moved horizontally with respect to platen 76 on tracks 103 and 103'.

As previously noted, slide members 67 and 67', 68 and 68' may be moved so that the amount of insulation stripped from each wire end may be varied. This adjustment may be made by pneumatic cylinders 73 and 74. Cylinder 74 shown in FIGURE 16 is bolted to the lower carriage member 66 by means of gusset mounting plate 101. To permit movement of the slide members 67, 67', 68, and 68' to vary the amount of insulation removed from the end of a conductor, these slide members are movably mounted on a plurality of bars, for example, in FIGURE 16 it can be seen that slide members 67 and 68 are supported by bar 112 and slide members 67' and 68' are supported by bar 113. The reciprocal output of cylinder 74 is imparted to a vertically disposed bar 105 which is connected by means of rod 106 to slide member 67'. Since cylinder 74 moves with the lower carriage member 66, a rigid connection may be made between rod 106 and bar 105. However, in the case of slide member 67 it is necessary to provide a slidable connection. For this purpose, rod 107 extending from bar 105 movably engages slide 108 which is connected to slide member 67 by means of rod 109. Slide 108 moving up and down on rod 107 forms a connection between slide member 67 and cylinder 74 in such a manner as to control the sideward motion of slide member 67 without restraining the vertical movement of upper carriage member 65.

FIGURE 17 is a fragmentary sectional view of the apparatus illustrating lower wire cutter 13' and wire insulation strippers 14' and 15' and the adjustment means associated therewith. This view is taken through a horizontal plane to show lower carriage member 66 and pneumatic cylinders 73 and 74 which are adapted to move slide members 67, 67', 68, and 68'. Cylinder 73 is mounted on the lower carriage member 66 by means of the gusset mounting plate 114. The output from cylinder 73 is transmitted to bar 115 which is rigidly connected to rod 108 attached to slide member 68'. Cylinder 73 may be in slidable engagement with slide member 68 in a manner similar to the slide connection made between bar 105 and rod 106 shown in FIGURE 16. It is noted that in the case of cylinder 73, the connection to slide member 68' is made by extending rod 109 through slide member 67'. A similar construction may exist with respect to the connection to slide member 68 through slide member 67 which is made behind rod 112 shown in FIGURE 16. From the mechanical connections to cylinders 73 and 74 as described in FIGURES 16 and 17, it can be seen that blades 14, 14', 15 and 15' may be selectively positioned to remove a desired amount of insulation from each wire being stripped during the operation illustrated in FIGURE 11a.

While cylinders 73 and 74 determine the amount of insulation removed from the wires being stripped, cylinders 71 and 72 shown in FIGURE 17 determine the particular matching pair of blades $a$, $b$, and $c$ of insulation strippers 14, 14', 15, and 15' to be utilized. Tape control 32 shown in FIGURE 1 determines the sequence of wires supplied to the apparatus and also simultaneously controls cylinders 71, 72, 73, and 74 to determine the stripper blades to be utilized and also the amount of insulation to be removed. The reciprocal outputs of cylinders 71 and 72 are transmitted to vertical bars 117 and 118 which are rigidly connected to the lower carriage member 67' and 68' and are in slidable engagement with the upper slide members 67 and 68 in a manner similar to the slide connection illustrated in FIGURE 16 between cylinder 74 and slide members 67 and 68.

From the previous description of the operation of the present apparatus made with reference to FIGURES 6–14a, it is noted that as many as seven different wires may be supplied to the apparatus and that a segment of any desired type of wire may be connected in a desired sequence by connector assemblies. To supply the wire to the apparatus, the wire from reels 2 in FIGURE 1 are first supplied to a selector bar 4 which comprises in this particular embodiment seven first wire-gripping means 5. In the description starting with FIGURE 6, wire is supplied from one wire-gripping means and in FIGURE 9 wire is supplied from another wire-gripping means 5. In order to move the selector bar 4 to align a desired wire-gripping means 5 with second wire-gripping means 6 as shown in FIGURES 1 and 15, a suitable pneumatic cylinder 125 actuated by the tape control 32 in FIGURE 1 may be utilized. Cylinder 125 is connected by link 126 to selector bar 4, the cylinder having seven operating positions regulated by the tape control 32. After a suitable wire-gripping means 5 has been positioned as shown in FIGURE 6, it is desirable that the wire be secured in both wire-gripping means 5 and 6. Furthermore, it is also desirable that the wire-gripping means 5 and 6 be reciprocally mounted so that when the wire is engaged by wire insulation strippers 14, 14', 15, and 15', the movement of the wire-gripping means results in the removal of the insulation from the ends of the respective wires. Under such circumstances, it is necessary that the respective wires be secured to the respective wire-gripping constructions. In FIGURE 6a there exists a situation where wire 37 is being passed through wire-gripping means 5 to second wire-gripping means 6 and the wire is not secured.

FIGURE 18 discloses suitable means for performing the above identified gripping and stripping functions. Selector bar 4 is reciprocally mounted on tracks 135 and 135' provided by portion 133 of the frame of the apparatus. FIGURE 18 also shows a sectional view of one of the first wire-gripping means 5 as well as the second wire-gripping means 6. Each of the wire-gripping means 5 comprises a longitudinal member 138 with a longitudinal opening 140 passing therethrough. Associated with each of the wire-gripping means 5 is a follower 137 which when in alignment with wire-gripping means 6 is engaged by the reciprocating slide member 136. This slide member 136 is associated with cam follower 146 to selectively reciprocate the individual wire-gripping means in selector bar 4. At the end of the longitudinal member 138 adjacent the wire-gripping and wire-severing means is a movable jaw 141 pivoted about pin 142, the movement of jaw 141 being controlled by cam follower 143 which is associated with surface 145 of cam member 7. Cam member 7 further has an inner annular cam surface 144 which is associated with cam follower 146 to control the reciprocal motion of one of the first wire-gripping means 5 in the selector bar.

Wire-gripping means 6 receives wire leads from each of the wire-gripping means 5 mounted on the selector bar. Wire-gripping means 6 comprises a longitudinal member 150 which is reciprocally mounted in portion 134 of the frame of the apparatus. In a manner similar to wire-gripping means 5, this longitudinal member has a longitudinal opening 151 and attached at the end thereof, adjacent the wire cutters and wire insulation strippers is a jaw 152 pivotally mounted about pin 153 which is actuated by cam follower 154 associated with cam surface 158 of cam member 8. Cam member 8 further has a cam surface 157 associated with cam follower 155 which is connected by means of bracket 156 to the end of longitudinal member 150. By means of the cam surfaces 144 and 145 of cam member 7 and cam surfaces 158 and 157 of cam member 8, selective reciprocating motion of the wire-gripping means is supplied in desired amounts at desired intervals, the engagement of wires between the jaws of each wire-gripper means being selectively performed to permit desired motion of the wires therethrough. The nature of cam surfaces 158 and 145 is such that in FIGURES 5, 6, and 6a, jaw members 141 and 152 permit movement of wire through the wire-gripping means and cam surfaces 144 and 157 are such during the operation of the machine as shown in FIGURE 11a, the wire-gripping means are moved in opposite directions to remove the insulation from the wire ends. The wire-gripping means are returned by cam surfaces 144 and 157 to the position shown in FIGURE 6a to permit the supply of another wire from the selector bar.

The particular sequence of operations determined by cam 7 and 8 is controlled by the previously mentioned single revolution of motor 12 which rotates shaft 85 and miter gears 127 and 128 one revolution causing shaft 129 attached to gear 128 to rotate gear 130. Gear 130 which meshes with gears 9 and 10 rotates these gears one revolution and through the shaft connections 131 and 132, cam members 7 and 8 are rotated one revolution to provide the previously described motions.

FIGURE 19 discloses feed means for supplying the terminal assembly which comprises the connector assemblies connecting the ends of the wires which have been cut and stripped of their insulation. Connector assemblies 39 are supplied from spool 30 shown in FIGURE 1 to connector supply means 22 which comprises a stationary table 160 having a channel 161 into which the connector assemblies are passed. The connector assemblies are intermittently advanced by pawl drive 165 which comprises pawl 166 adapted to intermittently engage individual connector assemblies and urge them toward anvil 20.

Pawl 166 is yieldably urged by spring 167 against a connector assembly and toward table 160. Pawl 166 is pivotally connected to cam follower 168 which is rotatably mouted on shaft 169 extending from flange 170 of table 160. Cam follower 168 has a pair of cam surfaces 168' and 168" which are associated with cam 172 connected to reciprocal member 171 attached to rods 173 and 174. Rods 173 and 174 are reciprocated through their connection with rod 175 which is operatively associated with cam 26 shown in FIGURE 1, cam 26 being associated with the previously mentioned shaft 85 connected to motor 12. Each rotation of shaft 85 reciprocates member 171 and cam 172, upward motion of cam 172 causing engagement with cam surface 168" and a consequent terminal advance, downward motion of cam 172 causing engagement with surface 168' permitting the pawl to pass over a connector assembly to position the pawl for the next connector assembly advance.

There is located a yieldable section 178 at the end of channel 161 adapted to engage the cutter member 177 associated with reciprocal member 171. From the construction illustrated in FIGURE 19, it can be seen that with the advance of connector assemblies 39 there is also performed a severing of these connector assemblies from the terminal assembly 50 (FIGURE 5). In the present embodiment strip 51 is severed at line 54 which forms a pair of protuberances extending beyond the mounting portion of the terminals. These severed connector assemblies are retained on table 160 by a plate (not shown) until the sequence of connector assembly advances causing a particular connector assembly to be passed from table 160 onto anvil 20. In the position shown in FIGURE 19, anvil 20 is at substantially its lowest position. Anvil 20 comprises a holding abutment 185 actuated by a conventional spring biased trip mechanism which is adapted to engage strip portion 51' of the connector assembly shown in FIGURE 3. Holding abutment 185 is tripped by the pin 187 which causes abutment 185 to frictionally engage strip portion 51' and urge it against retainer surface 186. Tripping of pin 187 is caused by engagement of the pin with surface 188, a stationary tripping surface engaged during the downward movement of anvil 20. As the anvil passes downward to its lower-most position, there is supplied a connector assembly followed by the actuation of abutment 185. With the connector assembly so attached and mounted on retainer surface 186, the connector assembly is in position to be passed upward adjacent the ends of stripped wire leads being held by wire-gripping means 5 and 6 illustrated in FIGURE 18. The connector assembly is suitably attached to the wire by the coaction of the anvil 20 with crimping means 23.

FIGURE 20 is a sectional view of crimping means 23. The ears of the terminals (FIGURE 4) which engage the insulation of the wire leads are crimped by dies 201 and 204, while crimping dies 202 and 203 are adapted to wrap the ears about the conductor portions of the wire leads. These dies are of a conventional design having arcuate surfaces adapted to wrap the ears of the terminals about the wires. The position of the crimping dies 201, 202, 203, and 204 which extend from housing 200 must be positioned according to the size of the wire being crimped. In order to move the crimping dies, suitable cams 205, 206, 207, and 208 adapted to engage surfaces of dies 201, 202, 203, and 204 may be utilized to position the crimping dies in housing 200. Relative movement of the cams 205, 206, 207, and 208 may be accomplished by actuation of the gears 210, 211, 212, and 213 which are connected to respective cams 205, 206, 207, and 208. Actuation of the gears is accomplished by suitable actuation by pneumatic cylinders 215, 216, 217, and 218 (shown in FIGURE 15) which have reciprocating rack outputs associated with the previously mentioned gears. The position of the racks associated with each of the pneumatic cylinders of the crimping means may be controlled by tape control 23 shown in FIGURE 1.

Having duly positioned the crimping dies 201, 202, 203, and 204, the entire crimping means 23 may be reciprocated by cam 24 (shown in FIGURE 15) having cam surface 220 which engages cam follower 221 associated with rod 222 connected to crimping means 23. Similarly, anvil 20 is associated with cam 25 having cam surface 191 for moving cam follower 192 connected to rod 190 which is attached to anvil 20 (also shown in FIGURE 19).

FIGURE 21 shows anvil 20 passing with a connector assembly 39 toward wires 36 and 37 while crimping means 23 having crimping surface 204' passes downward toward wires 36 and 37. As the crimping dies engage the anvil holding connector assembly 39, the connections of the terminal portions of the connector assembly are made with wire leads 36 and 37 as shown in FIGURE 3. This engagement is accompanied by trip release 225 associated with the crimping means 23, passing into opening 189 shown in FIGURE 19 to permit holding abutment 185 to release the connector assembly from the anvil and to cock the trip mechanism to permit the anvil to receive another connector assembly.

With the application of connector assembly 39 to wire leads 36 and 37 as shown in FIGURES 14 and 14a, the entire sequence of severing a wire, aligning a second wire with the first wire, stripping the insulation from the ends of the wires, and applying a connector assembly completes a single operation whereby the tape control 32 in FIGURE 1 may actuate the drive means 31 to pass the product toward the spool 33 and repeat the sequence of operations as outlined in the description of FIGURES 6–14a.

The present invention fabricates a product which includes a plurality of wires having desired lengths and gages connected by connector assemblies. These connector assemblies supply the terminal connections for the wire leads which are to be utilized in wiring an apparatus. The wire leads are supplied in a continuous length to permit convenient storage of the wire leads in such a manner that when an apparatus is to be wired, the leads are supplied in a desired sequence from the spool storing means. While mechanical and pneumatic actuators have been disclosed, it will be appreciated that other actuating means may be utilized such as electromechanical means while still practicing the present invention.

While I have described a preferred embodiment of my invention, it will be understood that my invention is not limited thereto since it may be otherwise embodied within the scope of the appended claims.

What I claim as new and desire to secure by Letters Patent of the United States is:

1. In an apparatus for forming wire-connector assemblies, the combination of a plurality of supply sources for supplying a length of insulated wire, selective means towards which the wire is fed from one of the supply sources, control means operably connected to said selective means for controlling said selection, wire cutters located between said selective means and said supply source for severing the wire subsequent to the selection operation, as said wire is being held by said selective means and said supply source, whereby the severed ends are adjacent one another and in substantial alignment, insulation strippers coacting with said supply source and selective means whereby relative movement between either of the latter two and the insulation strippers removes the insulation from adjacent ends of said severed wires, means for supplying a connector having a pair of terminals aligned with and adjacent to the severed ends of adjacent wires, a crimping die and an anvil located between said selective means and said supply source for applying said connector to the ends of said severed wires.

2. In an apparatus for forming wire-connector assemblies, the combination of a plurality of wire grippers, wire engaging means for receiving the wire from said wire grippers, control means for aligning any one of said wire grippers with the wire engaging means, an endless belt drive for passing wire through the wire engaging means, wire cutters located between said wire grippers and said wire engaging means which sever the wire as said wire is being held by one of said wire grippers and said wire engaging means, means for supplying a connector having a pair of terminals aligned with and adjacent to the severed ends of adjacent wires, and a crimping die and anvil movable to a position between said wire grippers and said wire engaging means for securing said connector to the ends of the severed wires being held between the wire gripper and said wire engaging means.

3. In an apparatus for forming wire-connector assemblies, the combination of a plurality of wire grippers, wire engaging means towards which the wire travels from said wire grippers, control means for aligning one of said wire grippers with the wire engaging means, wire cutters located between said wire grippers and said wire engaging means which sever the insulated wire held by one of said wire grippers and said wire engaging means whereby the severed ends remain adjacent one another, insulation strippers which coact with said wire grippers and said wire engaging means whereby relative movement between both said wire grippers and said wire engaging means and said insulation strippers removes the insulation from the severed ends of the adjacent wires as they are being held between one of said wire grippers and said wire engaging means, means for supplying a connector having a pair of terminals adjacent to and aligned with the severed ends of adjacent wires, crimping dies and an anvil for securing said terminals to the ends of the severed wires held between said wire gripper and said wire engaging means, said crimping dies and anvil being movable to a position between said wire grippers and said wire engaging means, and means for passing the connecting means attached to the wire ends through the wire engaging means.

4. In an apparatus for forming wire-connector assemblies, the combination of a plurality of first wire grippers, control means for positioning one of said first wire grippers in operable position with a second wire gripper located diametrically opposite said first wire grippers and adapted to receive said wire from said first wire grippers, a gear driven cam for actuating said second wire gripper, wire cutters located between said first and second wire grippers for severing insulated wire held between the first and second wire grippers, insulation strippers for cutting the insulation of severed ends of the adjacent wires as they are being held between said first and second wire grippers, cams operably connected to said wire grippers for moving the first wire grippers and the second wire grippers in the opposite directions while said insulation strippers hold the cut portion of insulation on each wire stationary to strip the insulation from the ends of adjacent wires, a cam and pawl operably connected to said insulation strippers to function subsequent to said insulation stripping operation for supplying a connector having a pair of terminals aligned with and adjacent to the severed wire ends, crimping dies and an anvil positioned between said first and second wire grippers for mounting the connector on the wire ends, and means for passing the connector and attached wire through the second wire grippers.

5. In an apparatus for forming wire-connector assemblies, the combination of a reciprocal table and a plurality of movable first wire grippers, a second wire gripper positioned diametrically opposite said first wire grippers adapted to receive said wire from said first wire grippers, said second wire gripper being reciprocally mounted for movement opposite to that of the movement of said first wire gripper, control means for aligning one of said first wire grippers with the second wire gripper, movably mounted wire cutters being located between the first and second wire grippers for severing the wire as the wire is being held between said grippers, fluid cylinder positionable wire insulation strippers located between said first and second wire grippers for cutting the insulation and remaining in engagement with the severed wires as they are held by the first and second wire grippers, cams operably connected to said insulation strippers, means for simultaneously moving the first and second wire grippers in opposite directions while the insulation strippers are held in engagement with the wire and the severed insulation thereon to strip the insulation from the wire ends, a movable anvil operably connected to said wire strippers for supplying by a cam operably connected to a pawl, a connector having a pair of terminals aligned with and adjacent to the severed wire ends, cam control crimping dies for mounting the connecting means to the wire ends, said anvil and crimping dies being operable by cam means so as to be positioned for engagement in an area between the first and second wire grippers subsequent to said stripping operation.

References Cited in the file of this patent

UNITED STATES PATENTS

| | | |
|---|---|---|
| 2,215,066 | Clark | Sept. 17, 1940 |
| 2,225,739 | Elliott | Dec. 24, 1940 |
| 2,571,078 | Vollmer | Oct. 9, 1951 |
| 2,592,276 | Hachbarth | Apr. 8, 1952 |
| 2,768,425 | Andren | Oct. 30, 1956 |
| 2,821,011 | Sanders et al. | Jan. 28, 1958 |
| 2,827,940 | Davis et al. | Mar. 25, 1958 |
| 2,917,099 | Seward | Dec. 15, 1959 |
| 2,954,599 | Cootes et al. | Oct. 4, 1960 |
| 2,965,957 | Packard | Dec. 27, 1960 |

FOREIGN PATENTS

| | | |
|---|---|---|
| 637,645 | Canada | Aug. 15, 1958 |